(12) United States Patent
Braun et al.

(10) Patent No.: US 12,468,521 B2
(45) Date of Patent: Nov. 11, 2025

(54) COMPUTER-IMPLEMENTED METHOD AND SYSTEM FOR A TIME-CONTROLLED DELIVERY OF UPDATABLE SERVICES TO ON-BOARD SYSTEMS OF VEHICLES WHICH USE THE SERVICES

(71) Applicant: Bayerische Motoren Werke Aktiengesellschaft, Munich (DE)

(72) Inventors: Jochen Braun, Munich (DE); Christian Denich, Munich (DE); Ulrich Muehlbauer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 76 days.

(21) Appl. No.: 18/016,195

(22) PCT Filed: Aug. 2, 2021

(86) PCT No.: PCT/EP2021/071582
§ 371 (c)(1),
(2) Date: Jan. 13, 2023

(87) PCT Pub. No.: WO2022/033912
PCT Pub. Date: Feb. 17, 2022

(65) Prior Publication Data
US 2023/0273784 A1 Aug. 31, 2023

(30) Foreign Application Priority Data
Aug. 14, 2020 (DE) .................. 10 2020 121 417.0

(51) Int. Cl.
*G06F 9/44* (2018.01)
*G06F 8/65* (2018.01)
(Continued)

(52) U.S. Cl.
CPC ............... *G06F 8/65* (2013.01); *H04L 67/12* (2013.01)

(58) Field of Classification Search
CPC ......... G06F 8/65; G06N 20/00; H04L 67/535; H04L 67/12; H04L 67/303; H04L 67/62; H04L 43/0811; H04L 43/0867
See application file for complete search history.

(56) References Cited

U.S. PATENT DOCUMENTS 10,318,269 B2 * 6/2019 Tiles ........................ G06F 8/65
10,984,479 B1 * 4/2021 Kyne .................... H04L 67/12
(Continued)

FOREIGN PATENT DOCUMENTS

CN 103512577 A 1/2014
DE 102019114595 A1 * 2/2020 ......... B60K 31/0058
(Continued)

OTHER PUBLICATIONS

English translation Wahler (EP 3651380 A1), 2020, pp. 1-27 (Year: 2020).*
(Continued)

*Primary Examiner* — Mongbao Nguyen
(74) *Attorney, Agent, or Firm* — Crowell & Moring LLP

(57) ABSTRACT

A computer-implemented method for a time-controlled delivery of updatable services to on-board systems of vehicles which use the services. The method includes analyzing the detected data to identify delivery time periods for the updatable services being optimal for each vehicle which uses the services, wherein the network usage of the backend server is optimally allotted to the specified time period on the basis of the availability of the data connection of the vehicles using the services to the backend server. A system
(Continued)

for a time-controlled delivery of updatable services to on-board systems of vehicles that use the services is also disclosed.

18 Claims, 3 Drawing Sheets

(51) Int. Cl.
    *G06F 9/445*     (2018.01)
    *G06F 9/45*     (2006.01)
    *H04L 67/12*     (2022.01)

(56) References Cited

U.S. PATENT DOCUMENTS

| | | | |
|---|---|---|---|
| 2011/0264361 | A1 | 10/2011 | Staehlin |
| 2013/0345977 | A1 | 12/2013 | Shimizu et al. |
| 2018/0115889 | A1* | 4/2018 | Todorovic ............. H04W 8/245 |
| 2018/0176329 | A1* | 6/2018 | Chen ............. H04W 8/245 |
| 2018/0261020 | A1 | 9/2018 | Petousis et al. |
| 2018/0275983 | A1* | 9/2018 | Kwon ............. G06F 8/65 |
| 2019/0219405 | A1 | 7/2019 | Ewert |
| 2019/0238638 | A1* | 8/2019 | Way ............. H04L 12/66 |
| 2019/0303129 | A1* | 10/2019 | Nidumolu ............. H04L 45/563 |
| 2019/0378355 | A1* | 12/2019 | Bruneel, II ............. H04W 4/40 |
| 2020/0023862 | A1* | 1/2020 | Rodriguez Bravo .... G07C 9/38 |
| 2020/0092396 | A1* | 3/2020 | Wu ............. H04W 72/121 |
| 2020/0153902 | A1 | 5/2020 | Higuchi et al. |
| 2020/0153926 | A1 | 5/2020 | Slater |
| 2020/0241869 | A1* | 7/2020 | Niemiec ............. H04W 12/106 |
| 2020/0401391 | A1* | 12/2020 | Ucar ............. H04W 4/50 |
| 2021/0024103 | A1* | 1/2021 | Hara ............. G01C 21/3407 |
| 2022/0027820 | A1* | 1/2022 | Chalam ............. G06Q 10/02 |
| 2022/0043459 | A1* | 2/2022 | Ayers ............. H04L 67/12 |

FOREIGN PATENT DOCUMENTS

| | | | | |
|---|---|---|---|---|
| DE | 102018220086 A1 | * | 5/2020 | ............. B60R 25/102 |
| EP | 3651380 A1 | * | 5/2020 | ............. H04B 7/18506 |
| WO | WO 2009/027120 A1 | | 3/2009 | |
| WO | WO 2017/215829 A1 | | 12/2017 | |
| WO | WO-2020159516 A1 | * | 8/2020 | ............. G08G 1/20 |

OTHER PUBLICATIONS

Mark Stevens, A Flexible On-Board Unit Architecture for Sensor Data and Fleet Management Services, 2018, pp. 1-8. https://ieeexplore.ieee.org/stamp/stamp.jsp?tp=&arnumber=8633587 (Year: 2018).*
English translation, Matthias (DE 102018220086 A1), 2020, pp. 1-13. (Year: 2020).*
English translation, Fan (DE 102019114549 A1), 2020, pp. 1-14. (Year: 2020).*
Taehyoung Kim, Compare of Vehicle Management over the Air and On-Board Diagnostics, 2019, pp. 1-2. https://ieeexplore.ieee.org/stamp/stamp.jsp?tp=&arnumber=8986260 (Year: 2019).*
English Translation, O'Sullivan Niall (WO 2020159516 A1), 2020, pp. 1-28. (Year: 2020).*
International Search Report (PCT/ISA/210) issued in PCT Application No. PCT/EP2021/071582 dated Dec. 8, 2021 with English translation (six (6) pages).
German-language Written Opinion (PCT/ISA/237) issued in PCT Application No. PCT/EP2021/071582 dated Dec. 8, 2021 (six (6) pages).
German-language Office Action issued in German Application No. 10 2020 121 417.0 dated Dec. 28, 2021 (five (5) pages).
Cover Page of EP 3 472 560 A1 published Apr. 24, 2019 (one (1) page).
Chinese-language Office Action issued in Chinese Application No. 202180038952.0 dated Apr. 24, 2025, with English translation (21 pages).

* cited by examiner

COMPUTER-IMPLEMENTED METHOD AND SYSTEM FOR A TIME-CONTROLLED DELIVERY OF UPDATABLE SERVICES TO ON-BOARD SYSTEMS OF VEHICLES WHICH USE THE SERVICES

BACKGROUND AND SUMMARY

The invention relates to a computer-implemented method for time-controlled delivery of updatable services to an on-board system of service-utilizing vehicles. The invention relates, moreover, to a system for time-controlled delivery of updatable services to an on-board system of service-utilizing vehicles. The invention further relates to a computer program and a computer-readable data carrier.

Vehicles of the current vehicle generation possess an on-board system in which a plurality of different services can be utilized. Such services relate, for instance, to navigation, traffic information, and the like. These services are updated at regular intervals. In the case of a navigation service, such an updating relates, for instance, to the delivery of navigation-map updates.

Delivery is effected from a backend server, which for the most part is cloud-based, to a corresponding receiving unit of the on-board system of the service-utilizing vehicles.

EP 3 472 560 A1 relates to a method for making a service available via a communications network, wherein a service server that provides the service for service users is accessed via the communications network.

When a new version of the service is available, the service updates are conventionally distributed to the service-utilizing vehicles within a predetermined period of time—for instance, within one quarter.

Delivery to the service-utilizing vehicles can, as a rule, be effected only when a data connection of the service-utilizing vehicle to the backend server is available. As a rule, this is the case when the vehicle is being moved, since the on-board system and the control units connected thereto are then active.

Since experience has shown that a large proportion of the service-utilizing vehicles are moved at particular times—for instance, at a peak traffic time—service updates can be delivered only to a limited number of vehicles by reason of limitations in a data-transmission bandwidth.

To the extent that a network loading of the backend server has reached a predetermined value—for instance, greater than or equal to 90%—the backend server will reject further update requests from service-utilizing vehicles.

A disadvantageous aspect of this procedure is that the existing data-transmission bandwidth of the backend server is not exploited optimally, and the updatable services can therefore be delivered to the service-utilizing vehicles only as quickly as the data-transmission bandwidth for the current service-delivery profile will allow.

There is therefore a need to make available an improved delivery of services to an on-board system of a vehicle.

The object is achieved with a computer-implemented method for time-controlled delivery of updatable services to an on-board system of service-utilizing vehicles, having the features as disclosed herein.

Moreover, the object is achieved with a system for time-controlled delivery of updatable services to an on-board system of service-utilizing vehicles, having the features as disclosed herein.

In addition, the object is achieved with a computer program having the features as disclosed herein, and with a computer-readable data carrier having the features as disclosed herein.

The present invention creates a computer-implemented method for time-controlled delivery of updatable services to an on-board system of service-utilizing vehicles. The method includes receiving data pertaining to a network loading of a backend server carrying out the delivery of services and to an availability of a data connection of service-utilizing vehicles to the backend server over a predetermined length of time.

The method includes, moreover, evaluating the acquired data for the purpose of identifying an optimal period of delivery of the updatable services for each service-utilizing vehicle, in which the network loading of the backend server is distributed optimally to the predetermined length of time as a function of the availability of the data connection of the service-utilizing vehicles to the backend server.

The method includes, in addition, delivering the updatable services by means of the backend server to the on-board system of the service-utilizing vehicles in the optimal delivery period identified for each service-utilizing vehicle.

In this connection, a person skilled in the art understands by a "network loading" a loading of a data-transmission bandwidth between the backend server and the service-utilizing vehicles, or a number of active network connections of the service-utilizing vehicles to the backend server.

The present invention creates, moreover, a system for time-controlled delivery of updatable services to an on-board system of service-utilizing vehicles. The system includes a plurality of service-utilizing vehicles that exhibit an on-board system which has been configured to establish a data connection to a backend server for receiving the updatable services.

The system includes, moreover, a backend server which has been configured to deliver the updatable services to the on-board system of the service-utilizing vehicles, the backend server exhibiting first means for receiving data pertaining to a network loading and to an availability of a data connection of service-utilizing vehicles over a predetermined length of time.

The backend server further includes second means for evaluating the acquired data for the purpose of identifying an optimal period of delivery of the updatable services for each service-utilizing vehicle, in which the network loading of the backend server is distributed optimally to the predetermined length of time as a function of the availability of the data connection of the service-utilizing vehicles to the backend server.

In addition, the backend server includes third means for delivering the updatable services to the on-board system of the service-utilizing vehicles in the optimal delivery period identified for each service-utilizing vehicle.

The present invention creates, in addition, a computer program with program code in order to carry out the method according to the invention when the computer program is executed on a computer.

The present invention creates, moreover, a computer-readable data carrier with program code of a computer program in order to carry out the method according to the invention when the computer program is executed on a computer.

It is an idea of the present invention to deliver the updatable services to the service-utilizing vehicles in such a manner that, taking the individual availability of respective vehicles into account, an improved distribution of the network loading of the backend server carrying out the delivery of services to the predetermined length of time can be obtained.

Consequently an increase in an average network loading over the predetermined length of time—such as, for instance, a day, a week or a month—can be made possible in advantageous manner. As a result, the number of service updates delivered within the predetermined length of time can be increased in comparison with the conventional method. Alternatively, there is the possibility of reducing a data-transmission bandwidth of the backend server, and hence of saving costs, while maintaining the same level of delivery in comparison with the conventional solution.

Advantageous embodiments and developments arise out of the dependent claims and also out of the description with reference to the Figures.

According to a preferred development, the invention provides that a delivery of services to vehicles that are being moved exclusively in a first period of above-average network loading, in particular during a peak traffic time, is carried out in the first period, and that a delivery of services to vehicles that are not being moved exclusively in the first period is carried out in a second period of below-average network loading, in particular during an off-peak traffic time.

It can consequently be ensured in advantageous manner that vehicles that are being moved both during a peak traffic time and during an off-peak traffic time receive service updates preferentially during the off-peak traffic time. Hence the average network loading can be increased, or the network loading can be distributed better over the predetermined period.

According to another preferred development, the invention provides that the delivery of the updatable services is carried out as a function of a regular route profile of the vehicle, the type of the delivered data being adapted to the route profile of the vehicle. It can consequently be guaranteed that services relevant to the respective route profile—such as, for instance, a weather forecast, traffic information and/or navigation-map updates—are made available.

According to another preferred development, the invention provides that the updatable services comprise traffic information, navigation-map updates and/or parking-lot information, the service being delivered for all updating regions if the route profile of the vehicle comprises a plurality of geographical updating regions. If a route profile of the vehicle were to comprise, for instance, a plurality of countries such as, for instance, Germany, Austria and Italy, navigation-map updates or other services for all the aforementioned countries or regions are therefore delivered together or in immediately consecutive manner.

According to another preferred development, the invention provides that the on-board system of the service-utilizing vehicles sends service-update requests to the backend server at regular intervals, the service-update requests comprising data relating to a requested region, a current version of the region, and data relating to the service-usage behavior of the vehicle user. The delivery of the services in question can consequently be adapted optimally to the service-usage behavior of the vehicle user.

According to another preferred development, the invention provides that the delivery of the updatable services is carried out as a function of a recorded service-usage behavior of the vehicle user, a prioritized delivery of the service being carried out if a frequency of usage of a service exceeds a predetermined threshold value. Vehicle users who regularly utilize a service are consequently prioritized in the course of delivery in comparison with vehicle users who utilize the service irregularly.

According to another preferred development, the invention provides that in response to the service-update request of the on-board system of the service-utilizing vehicle the backend server initiates the delivery of the service or sends to the on-board system of the service-utilizing vehicle a message relating to a time-shifted delivery of the service, or a prompt for a renewed service-update request, the renewed service-update request falling within a period in which an expected lower network loading and an expected availability of the data connection of the service-utilizing vehicle coincide.

Consequently, in response to their service-update request the service-utilizing vehicles—which, for instance, are being moved outside a peak traffic time—receive the message to make a renewed service-update request during an expected next movement of the vehicle outside the peak traffic time.

According to another preferred development, the invention provides that the network loading of the backend server carrying out the delivery of services and the availability of the data connection from the service-utilizing vehicles to the backend server are acquired continuously.

Consequently, in advantageous manner an evaluation of an intersection of the network loading and the availability of the data connection of the vehicles can be determined, and temporally optimal delivery periods with optimized network loading over the predetermined length of time can be obtained. In this connection, availabilities and network loadings at particular times or on particular days—such as weekdays, weekend days etc.—for instance, are likewise drawn upon.

According to another preferred development, the invention provides that the evaluating of the acquired data for the purpose of identifying the optimal period of delivery of the updatable services for each service-utilizing vehicle is carried out by a machine-learning algorithm or by a stochastic model, and a foreseeable network loading is learned or ascertained by the machine-learning algorithm or by the stochastic model on the basis of historical data.

In the case of the use of a machine-learning algorithm, the algorithm can be trained to optimize a target function on the basis of the input data pertaining to the network loading and also to the vehicle availability, in order to approximate an optimal delivery period, in which the network loading is optimized, for each individual service-utilizing vehicle.

According to another preferred development, the invention provides that the availability of the data connection of the service-utilizing vehicles to the backend server obtains in the course of an operation of the vehicles and/or in an activated state of the on-board system of the vehicles. On the basis of, for instance, historical availability data pertaining to the service-utilizing vehicles, an estimation or approximation of a future availability can consequently be carried out.

According to another preferred development, the invention provides that the availability of the data connection of the service-utilizing vehicles to the backend server is recorded by the on-board system and communicated, in particular at predetermined intervals, to the backend server. Hence it can be ensured that, for instance, in the event of a fluctuating usage behavior by reason of different drivers of a vehicle, for instance, a delivery strategy of the backend server is always adapted to the current usage behavior of the service-utilizing vehicle.

The configurations and developments described can be combined with one another arbitrarily.

Further possible configurations, developments and implementations of the invention also encompass combinations, not mentioned explicitly, of features of the invention described previously or in the following with respect to the exemplary embodiments.

The accompanying drawings are intended to impart a further appreciation of the embodiments of the invention. They illustrate embodiments and serve, in conjunction with the description, for the elucidation of principles and concepts of the invention.

Other embodiments, and many of the advantages mentioned, result in the light of the drawings. The represented elements of the drawings have not necessarily been shown true to scale relative to one another.

DETAILED DESCRIPTION

Figure 1:
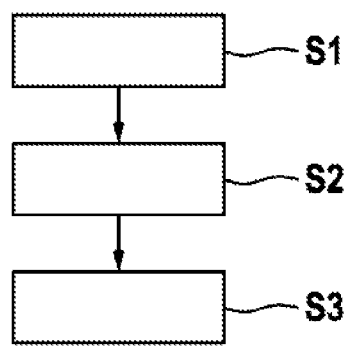
FIG. 1 shows a flowchart of a computer-implemented method for time-controlled delivery of updatable services to an on-board system of service-utilizing vehicles, according to a preferred embodiment of the invention.

The computer-implemented method shown in FIG. 1 for time-controlled delivery of updatable services D to an on-board system 2 of service-utilizing vehicles 1 includes receiving S1 data 10 pertaining to a network loading L of a backend server 12 carrying out the delivery of services and to an availability V of a data connection of service-utilizing vehicles 1 to the backend server 12 over a predetermined length of time T.

The method includes, moreover, evaluating S2 the acquired data 10 for the purpose of identifying an optimal period of delivery A1, A2, A3 of the updatable services D for each service-utilizing vehicle 1, in which the network loading L of the backend server 12 is distributed optimally to the predetermined length of time T as a function of the availability V of the data connection of the service-utilizing vehicles 1 to the backend server 12.

In addition, the method includes delivering S3 the updatable services D by means of the backend server 12 to the on-board system 2 of the service-utilizing vehicles 1 in the optimal delivery period A1, A2, A3 identified for each service-utilizing vehicle 1.

Figure 2:
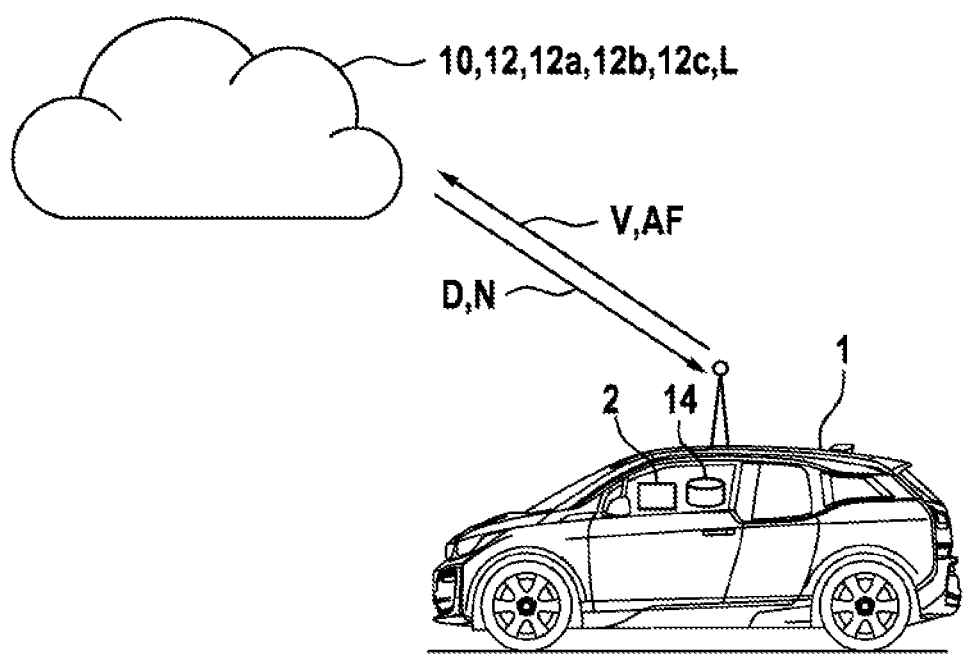
FIG. 2 shows a schematic representation of a system for usage-controlled delivery of services to the on-board system of the vehicle, according to the preferred embodiment of the invention.

FIG. 2 shows a schematic representation of a system for usage-controlled delivery of services to the on-board system of the vehicle, according to the preferred embodiment of the present disclosure.

The system includes a plurality of service-utilizing vehicles 1 that exhibit an on-board system 2 which has been configured to establish a data connection to a backend server 12 for receiving the updatable services D.

The system further includes a backend server 12 which has been configured to deliver the updatable services D to the on-board system 2 of the service-utilizing vehicles 1, the backend server 12 exhibiting first means 12a for receiving data 10 pertaining to a network loading L and to an availability V of a data connection of service-utilizing vehicles 1 over a predetermined length of time T.

The backend server 12 exhibits, furthermore, second means 12b for evaluating the acquired data 10 for the purpose of identifying an optimal period of delivery A1, A2, A3 of the updatable services D for each service-utilizing vehicle 1, in which the network loading L of the backend server 12 is distributed optimally to the predetermined length of time T as a function of the availability V of the data connection of the service-utilizing vehicles 1 to the backend server 12.

In addition, the backend server 12 exhibits third means 12c for delivering the updatable services D to the on-board system 2 of the service-utilizing vehicles 1 in the optimal delivery period A1, A2, A3 identified for each service-utilizing vehicle 1.

The delivery of the updatable services D is carried out as a function of a regular route profile of the vehicle 1. The type of the delivered data 10 is adapted to the route profile of the vehicle 1.

The updatable services D comprise traffic information, navigation-map updates and/or parking-lot information, the service being delivered for all updating regions if the route profile of the vehicle 1 comprises a plurality of geographical updating regions.

The on-board system 2 of the service-utilizing vehicles 1 sends service-update requests AF to the backend server 12 at regular intervals, the service-update requests AF comprising data 10 relating to a requested region, a current version of the region, and data 10 relating to the service-usage behavior of the vehicle user.

The delivery of the updatable services D is carried out as a function of a recorded service-usage behavior of the vehicle user. If a frequency of usage of a service D exceeds a predetermined threshold value, a prioritized delivery of the service D is carried out.

In response to the service-update request AF of the on-board system 2 of the service-utilizing vehicle 1 the backend server 12 initiates the delivery of the service D or sends to the on-board system 2 of the service-utilizing vehicle 1 a message N relating to a time-shifted delivery of the service D, or a prompt for a renewed service-update request AF.

The renewed service-update request AF falls within a period in which an expected lower network loading L and an expected availability V of the data connection of the service-utilizing vehicle 1 coincide.

The network loading L of the backend server 12 carrying out the delivery of services and the availability V of the data connection are acquired continuously by the service-utilizing vehicles 1 with the backend server 12.

The evaluating S2 of the acquired data 10 for the purpose of identifying the optimal period of delivery A1, A2, A3 of the updatable services D for each service-utilizing vehicle 1 is carried out by a machine-learning algorithm or by a stochastic model. Furthermore, a foreseeable network loading L is learned or ascertained by the machine-learning algorithm or by the stochastic model on the basis of historical data 10.

The availability V of the data connection of the service-utilizing vehicles 1 to the backend server 12 obtains in the course of an operation of the vehicles 1 and/or in an activated state of the on-board system 2 of the vehicles 1.

The availability V of the data connection of the service-utilizing vehicles 1 to the backend server 12 is recorded by the on-board system 2 and communicated, in particular at predetermined intervals, to the backend server 12.

Figure 3:
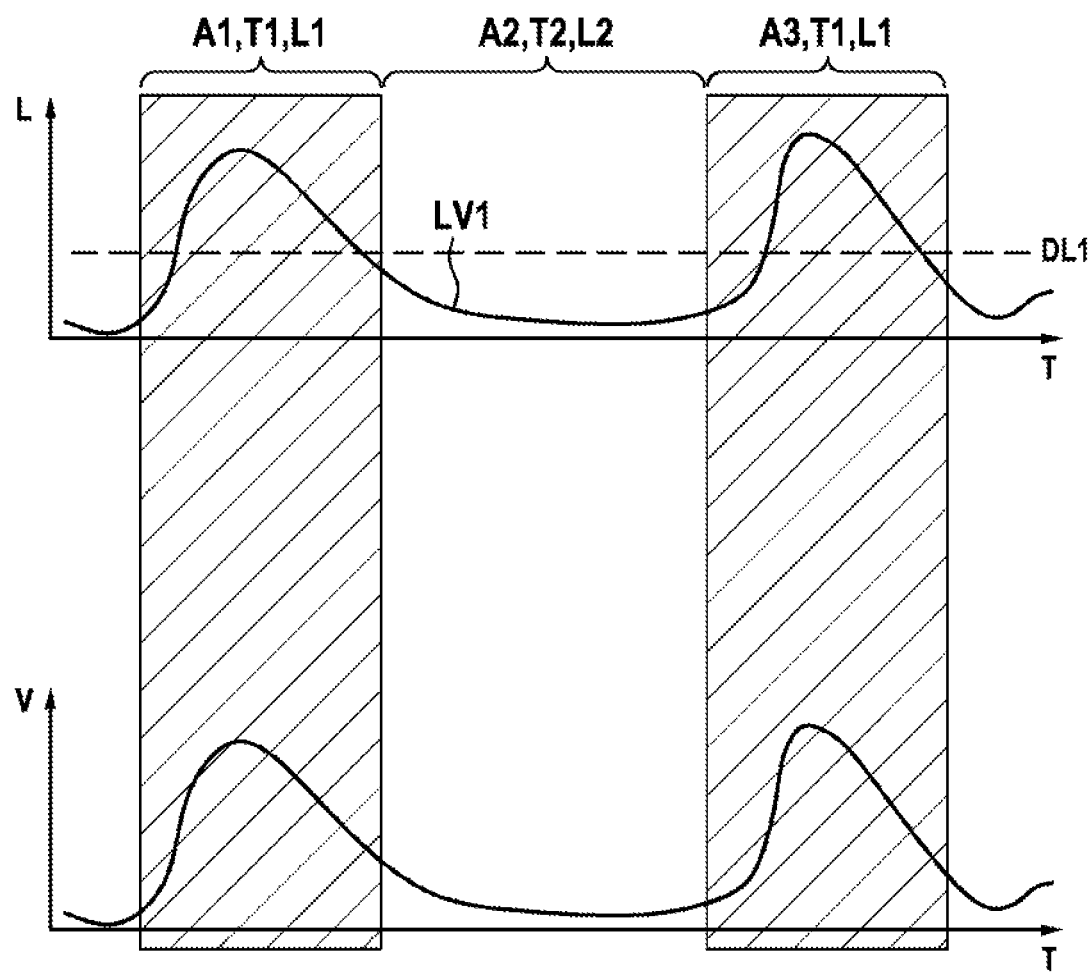
FIG. 3 shows a schematic representation of a network loading and of a vehicle availability on the basis of an example provided by a first vehicle, according to the preferred embodiment of the invention.

FIG. 3 shows a schematic representation of a network loading and of a vehicle availability on the basis of an example provided by a first vehicle, according to the preferred embodiment of the present disclosure.

The upper representation shows a temporal progression of a network loading L of the backend server 12 carrying out the delivery of services. The lower representation shows an availability V of the data connection of service-utilizing vehicles 1 to the backend server 12 over a predetermined length of time T.

As is evident from the Figure, the load distribution LV1 exhibits peak values in delivery periods A1, A3. The first delivery period A1 and the third delivery period A3 are therefore each lengths of time T1 with above-average network loading L1, in particular during a peak traffic time.

The load distribution LV1 exhibits a minimum during the second delivery period A2. In the second delivery period A2 there is therefore a below-average network loading L2.

An average load DL1 over the predetermined length of time consequently results from the load-distribution curve.

As is evident from the lower representation, an availability profile of the first vehicle is substantially identical to the curve of the load distribution shown at the top during the predetermined length of time T.

The first vehicle is consequently being moved exclusively during a peak traffic time—that is to say, during the first delivery period A1 and the third delivery period A3. Therefore a delivery of updatable services for this vehicle enters into consideration only during the first delivery period A1 and/or during the third delivery period A3.

Figure 4:
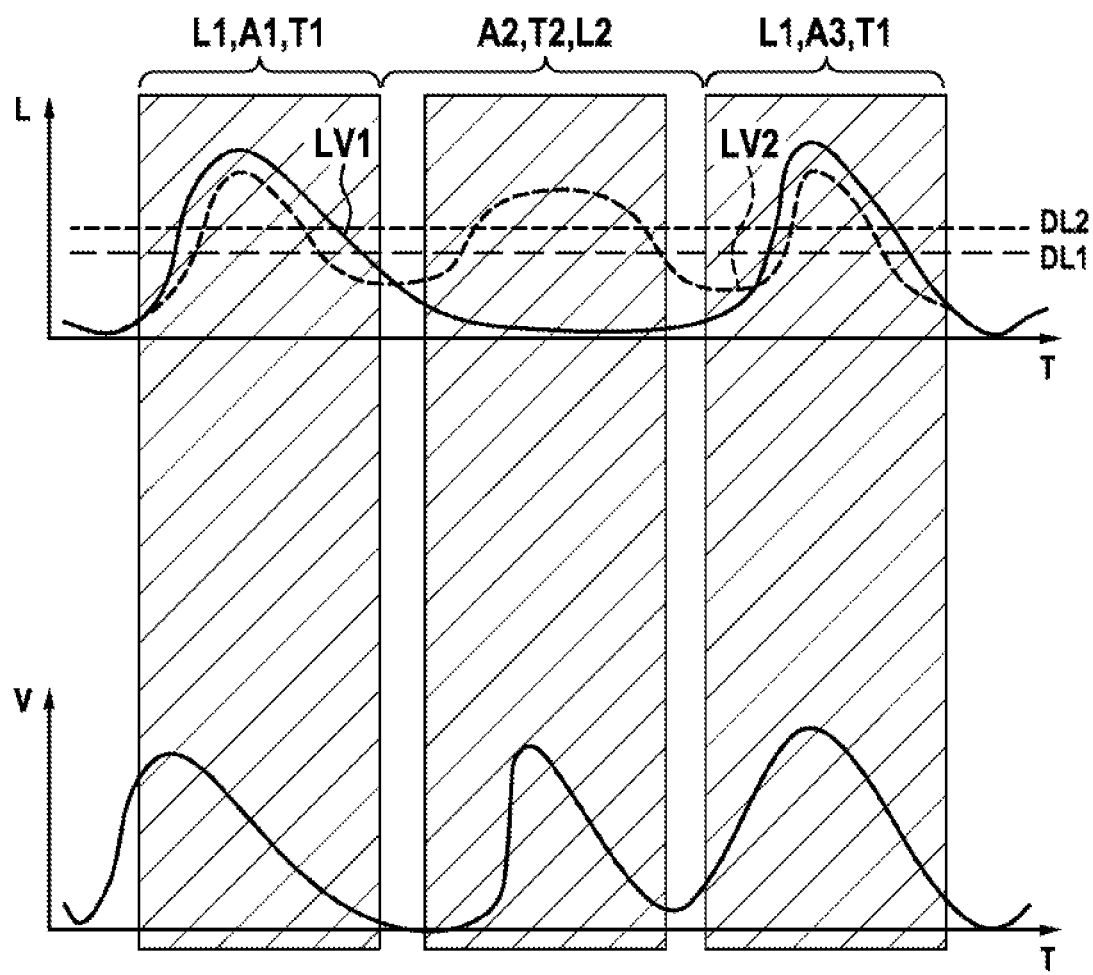
FIG. 4 shows a schematic representation of a network loading and of a vehicle availability on the basis of an example provided by a second vehicle, according to the preferred embodiment of the invention.

FIG. 4 shows a schematic representation of a network loading and of a vehicle availability on the basis of an example provided by a second vehicle, according to the preferred embodiment of the present disclosure.

The upper representation relates, as also in FIG. 3, to the network loading L of the backend server 12 carrying out the delivery of services. The lower representation relates to the availability V of the data connection of the service-utilizing vehicles 1 to the backend server 12 over the predetermined length of time T.

The first load distribution LV1 corresponds to the load distribution LV1 shown in FIG. 3. In contrast to the availability V, represented in FIG. 3, of the data connection of the vehicle 1 to the backend server 12, the second vehicle, shown in FIG. 4, is available in the first delivery period A1, in the third delivery period A3 and in the second delivery period A2. The delivery of the service D to the second vehicle can consequently be undertaken within the second delivery period A2.

If this procedure is projected onto a larger number of vehicles, this results in an amended load distribution or in a second load distribution LV2 which is represented by a dashed line. The second load distribution LV2 exhibits a more uniform load distribution in all the delivery periods A1, A2, A3. In advantageous manner, this results in an increase in the average network loading from the level of the average network loading DL1, represented in FIG. 3, to the raised average network loading DL2.

With the method according to the present disclosure, the second vehicle is consequently prioritized for the second delivery period A2, whereas the first vehicle is prioritized for the first delivery period A1 and the third delivery period A3.

The term "vehicle" encompasses passenger cars, trucks, buses, motor homes, motorcycles, etc. which serve for the transportation of people, goods, etc.

In particular, the term encompasses motor vehicles for the conveyance of passengers. Additionally or alternatively, a hybrid vehicle or electric vehicle may, according to embodiments, be a pure battery electric vehicle (BEV) or a plug-in hybrid electric vehicle (PHEV). However, use may also be made of other forms of propulsion, for instance in the form of a diesel-powered or gasoline-powered vehicle. The vehicle may also be present in the form of a rail vehicle.

Although the invention has been illustrated and elucidated in detail by means of preferred exemplary embodiments, the invention is not restricted by the disclosed examples, and other variations may be derived therefrom by a person skilled in the art without departing from the scope of protection of the invention.

It is therefore clear that a large number of possible variations exist. Embodiments mentioned by way of example represent only examples which are not to be construed in any way as limiting, for instance, the scope of protection, the possible applications or the configuration of the invention.

Rather, the foregoing description and the description of the Figures put a person skilled in the art in a position to realize the exemplary embodiments in concrete form, in which connection a person skilled in the art, having knowledge of the disclosed inventive concept, may undertake diverse amendments, for instance as regards the function or the arrangement of individual elements mentioned in an exemplary embodiment, without departing from the scope of protection that is defined by the claims and the legal equivalents thereof such as, for instance, more extensive explanatory remarks in the description.

The data 10 pertaining to the network loading L of the backend server 12 carrying out the delivery of services and to the availability V of the data connection of service-utilizing vehicles 1 to the backend server 12 over a predetermined length of time T are not only received but preferentially also recorded by the backend server.

The invention claimed is:

1. A computer-implemented method for time-controlled delivery of updatable services to an on-board system of service-utilizing vehicles, the method comprising:
    receiving data pertaining to a network loading of a backend server carrying out a delivery of services and to an availability of a data connection of service-utilizing vehicles to the backend server over a predetermined length of time;
    evaluating the data to identify an optimal delivery period of the updatable services for each service-utilizing vehicle, in which the network loading of the backend server is distributed within the predetermined length of time as a function of the availability of the data connection of the service-utilizing vehicles to the backend server;
    delivering the updatable services by the backend server to the on-board system of the service-utilizing vehicles in the optimal delivery period identified for each service-utilizing vehicle;
    sending, by the on-board system of the service-utilizing vehicles, service-update requests to the backend server at regular intervals, wherein the service-update requests comprise data relating to a requested geographical region, a current version of the geographical region, and data relating to a service-usage behavior of a vehicle user;
in response to the service-update request of the on-board system of the service-utilizing vehicle, at least one of:
initiating, by the backend server, the delivery of the updatable service;
sending to the on-board system of the service-utilizing vehicle a message relating to a time-shifted delivery of the updatable service; or
sending a prompt for a renewed service-update request, wherein the renewed service-update request falls within a period in which an expected lower network loading and an expected availability of the data connection of the service-utilizing vehicle coincide; and
executing, by at least one on-board system of at least one service-utilizing vehicle, the updatable service delivered by the backend server.

2. The computer-implemented method according to claim 1, further comprising:
delivering, during a first period of above-average network loading, the updatable services to vehicles that are being moved exclusively in the first period; and
delivering, during a second period of below-average network loading, the updatable services to vehicles that are not being moved exclusively in the first period.

3. The computer-implemented method according to claim 2, wherein the first period is during a peak traffic time, and wherein the second period is during an off-peak traffic time.

4. The computer-implemented method according to claim 1, further comprising:
delivering the updatable services to a particular service-utilizing vehicle as a function of a regular route profile of the particular service-utilizing vehicle, wherein a type of the delivered data is adapted to the regular route profile.

5. The computer-implemented method according to claim 4, wherein the updatable services comprise traffic information, navigation-map updates and/or parking-lot information, wherein the updatable service is delivered for all of a plurality of geographical updating regions in response to the regular route profile including the plurality of geographical updating regions.

6. The computer-implemented method according to claim 1, further comprising:
delivering the updatable services as a function of the service-usage behavior of the vehicle user, wherein a prioritized delivery of the updatable service is carried out in response to a frequency of usage of a service exceeding a predetermined threshold value.

7. The computer-implemented method according to claim 1, further comprising:
continuously acquiring the network loading of the backend server and the availability of the data connection from the service-utilizing vehicles to the backend server.

8. The computer-implemented method according to claim 1, further comprising:
evaluating the data to identify the optimal delivery period by a machine-learning algorithm or by a stochastic model, wherein a foreseeable network loading is learned or ascertained by the machine-learning algorithm or by the stochastic model on a basis of historical data.

9. The computer-implemented method according to claim 1, further comprising:
obtaining the availability of the data connection of the service-utilizing vehicles to the backend server in a course of an operation of the service-utilizing vehicles and/or in an activated state of the on-board system of the service-utilizing vehicles.

10. The computer-implemented method according to claim 9, further comprising:
recording the availability of the data connection of the service-utilizing vehicles to the backend server by the on-board system, and communicating the availability to the backend server.

11. A system for time-controlled delivery of updatable services to an on-board system of service-utilizing vehicles, comprising:
a plurality of service-utilizing vehicles comprising an on-board system configured to establish a data connection to a backend server to receive the updatable services; and
the backend server configured to:
deliver the updatable services to the on-board system of the service-utilizing vehicles;
receive data pertaining to a network loading and to an availability of a data connection of the service-utilizing vehicles over a predetermined length of time;
evaluate the acquired data to identify an optimal delivery period of the updatable services for each service-utilizing vehicle, in which the network loading of the backend server is distributed within the predetermined length of time as a function of the availability of the data connection of the service-utilizing vehicles to the backend server; and
deliver the updatable services to the on-board system of the service-utilizing vehicles in the optimal delivery period identified for each service-utilizing vehicle,
wherein the on-board system is configured to send service-update requests to the backend server at regular intervals, wherein the service-update requests comprise data relating to a requested geographical region, a current version of the geographical region, and data relating to a service-usage behavior of a vehicle user,
wherein the backend server is configured to, in response to the service-update request, send to the on-board system a message relating to a time-shifted delivery of the updatable service, and
wherein the on-board system is configured to execute the updatable service delivered by the backend server.

12. The system according to claim 11, wherein the backend server is configured to:
deliver, during a first period of above-average network loading, the updatable services to vehicles that are being moved exclusively in the first period; and
deliver, during a second period of below-average network loading, the updatable services to vehicles that are not being moved exclusively in the first period.

13. The system according to claim 11, wherein the backend server is configured to:
deliver the updatable services to a particular service-utilizing vehicle as a function of a regular route profile of the particular service-utilizing vehicle, wherein a type of the delivered data is adapted to the regular route profile.

14. The system according to claim 11, wherein the backend server is configured to:
continuously acquire the network loading of the backend server and the availability of the data connection from the service-utilizing vehicles to the backend server.

15. The system according to claim 11, wherein the backend server is configured to:
   evaluate the data to identify the optimal delivery period by a machine-learning algorithm or by a stochastic model, wherein a foreseeable network loading is learned or ascertained by the machine-learning algorithm or by the stochastic model on a basis of historical data.

16. The system according to claim 11, wherein the on-board system is configured to:
   obtain the availability of the data connection of the service-utilizing vehicles to the backend server in a course of an operation of the service-utilizing vehicles and/or in an activated state of the on-board system of the service-utilizing vehicles.

17. The system according to claim 11, wherein the on-board system is configured to:
   record the availability of the data connection of the service-utilizing vehicles to the backend server, and communicate the availability to the backend server.

18. A non-transitory computer-readable medium having stored thereon a computer program that, when executed by at least one computing device, cause the at least one computing device to perform a method comprising:
   receiving data pertaining to a network loading of a backend server carrying out a delivery of services and to an availability of a data connection of service-utilizing vehicles to the backend server over a predetermined length of time;
   evaluating the data to identify an optimal delivery period of the updatable services for each service-utilizing vehicle, in which the network loading of the backend server is distributed within the predetermined length of time as a function of the availability of the data connection of the service-utilizing vehicles to the backend server;
   delivering the updatable services by the backend server to an on-board system of the service-utilizing vehicles in the optimal delivery period identified for each service-utilizing vehicle;
   receiving from the service-utilizing vehicles, service-update requests at regular intervals, wherein the service-update requests comprise data relating to a requested geographical region, a current version of the geographical region, and data relating to a service-usage behavior of a vehicle user; and
   in response to the service-update request of one of the service-utilizing vehicles,
      sending a prompt for a renewed service-update request, wherein the renewed service-update request falls within a period in which an expected lower network loading and an expected availability of a data connection of the service-utilizing vehicle coincide,
   wherein the on-board system is configured to execute the updatable service delivered by the backend server.

* * * * *